United States Patent [19]

Maclay

[11] Patent Number: 4,776,689
[45] Date of Patent: Oct. 11, 1988

[54] SLIDE MAGAZINE FOR STORAGE AND RETRIEVAL SYSTEM

[75] Inventor: William R. Maclay, Los Gatos, Calif.

[73] Assignee: Slide Management Systems, Inc., Los Gatos, Calif.

[21] Appl. No.: 873,185

[22] Filed: Jun. 11, 1986

[51] Int. Cl.$^4$ .............................................. B65D 83/08
[52] U.S. Cl. .................................... 353/111; 353/112; 206/456
[58] Field of Search ................. 206/39, 39.4, 449, 454, 206/455, 456; 353/111, 112, 113

[56] References Cited

U.S. PATENT DOCUMENTS

| | | | |
|---|---|---|---|
| 2,812,056 | 11/1957 | Jenkins | 206/39 |
| 2,942,365 | 6/1960 | Badalich | 206/456 |
| 3,147,859 | 9/1964 | Misuraca | 206/456 |
| 3,495,902 | 2/1970 | Michnewicz | 353/112 |
| 3,552,846 | 1/1971 | Hansen | 206/456 X |
| 3,877,766 | 4/1975 | Seebald | 206/456 X |
| 4,274,719 | 6/1981 | Rochat | 353/112 X |
| 4,582,407 | 4/1986 | Rochat | 353/111 |
| 4,693,373 | 9/1987 | Lamb et al. | 353/112 |

Primary Examiner—William Price
Attorney, Agent, or Firm—Owen L. Lamb

[57] ABSTRACT

A slide receptacle comprised of a bin (8) and hopper (11) for receiving the bin. The bin is of substantially parallelepipedic shape, having an upper end, a lower end opposite the upper end, and four sidewalls. A pair of stop means including outwardly protruding tines (26, 28) are located on first and second opposing sidewalls at the lower end. Each of the stop means includes inwardly protruding tabs (22, 24) for partially closing the lower end, such that slides in the bin are prevented from dropping out of the lower end. The stop means are flexible such that pressure on tines (26, 28) causes tabs (22, 24) to open to allow slides to pass through the lower end. The hopper (40) has four inner walls, the dimensions of which conform to the outer dimensions of the bin. Two opposing inner walls (44, 46) are provided with grooves (48, 50, 52, 54), a bottom portion (70) of each groove bending outwardly. The grooves receive tines (26, 28), each groove bending outwardly to urge the tines and hence the tabs outward to release slides from the bin.

15 Claims, 2 Drawing Sheets

SLIDE MAGAZINE FOR STORAGE AND RETRIEVAL SYSTEM

CROSS REFERENCE TO RELATED APPLICATIONS

This application is related to copending U.S. Pat. No. 4,693,373, granted Sept. 15, 1987 and assigned to Slide Management Systems, Inc., the assignee of the present application.

FIELD OF THE INVENTION

The present invention relates to slide magazines and more particularly to a slide magazine adapted for use in an apparatus for performing photographic slide handling functions automatically under computer control.

BACKGROUND OF THE INVENTION

A slide magazine was needed to store slides in an editing apparatus of the type described in the above-identified patent. Additionally, a slide magazine was needed that not only could store slides but would also allow the slides to be retrieved from storage, sorted at the editing station, and returned to storage.

Prior slide magazines do exist for automatic slide projectors. In U.S. Pat. No. 3,644,033, "Slide Magazine," granted on Feb. 22, 1972 to Irwin M. Gould there is described an apparatus for storing slides in storage magazines that are adapted to be used with a slide projector. The magazines are shaped as a cube, with five slides of the cube closed and a fifth side fitted with a sliding square cover. Slides are placed in the cube by removing the cover, placing the slides therein and then sliding the cover in place. Slides are dropped out of the cube and into the projector through the same opening.

While this prior magazine is useful for storing slides, it does not lend itself to use in an apparatus that is able to sort slides into storage bins or magazines.

The primary object of the present invention is to provide a slide magazine that can be used with a computer-controlled automatic slide editing system.

DISCLOSURE OF THE INVENTION

Briefly, the above object is accomplished in accordance with a preferred embodiment of the invention by providing a slide magazine that is of substantially parallelepipedic shape, having a upper open end, a lower open end opposite said upper end, and four sidewalls. A pair of stop means which may include outwardly protruding tines, are located on first and second opposing sidewalls at said lower open end. Each of said stop means includes inwardly protruding tabs for partially covering said lower open end, such that slides in said magazine are prevented from dropping out of said lower open end. The stop means are flexible such that pressure thereon (for example on said tines) causes the tabs to open to allow slides to pass through said lower open end. The stops are spring loaded so the tabs return to their original position when the pressure is released.

The invention has the advantage that one or more of the slide magazines may be placed on a movable sorting table so that a hopper holding a group of slides in a stack above the table can deliver slides one by one into the upper open end of a selected one of the magazines.

The invention has the further advantage that the slide magazine may be placed in a hopper which is adapted to cooperate with the stop means on the magazine to thereby release the slides from the magazine into the hopper.

BRIEF DESCRIPTION OF THE DRAWINGS

The foregoing and other objects, features, and advantages of the invention will be apparent from the following detailed description of preferred embodiments of the invention as illustrated in the accompanying drawings wherein.

DESCRIPTION

Figure 1:
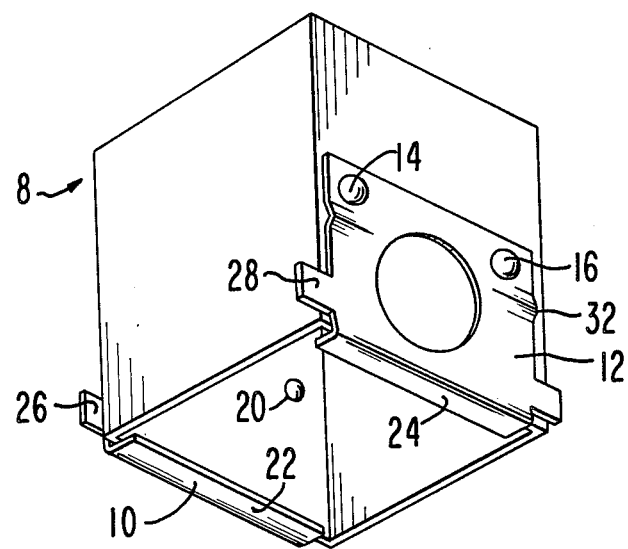
FIG. 1 is a perspective view of the slide magazine.

Referring to FIG. 1, the slide magazine or bin (8) is open at the top and bottom. Stop means (10, 12) are attached to opposing sidewalls by means of rivets (14, 16, 18, 20). The stop means act to retain the slides in the magazine by the action of metal tabs (22, 24) shown more clearly in FIG. 1. This structure forms a bin into which slides can be placed through the top opening and retained therein by the tabs (22, 24). The stop means (10, 12) are spring loaded and can be spread apart by outward pressure on tines (26, 28) to open the way in the bottom of the magazine when the magazine is placed in the hopper (40) of FIG. 2. The spring loading can be enhanced by creating a crimp (30, 32) in each of the stop means (10, 12).

Figure 2:
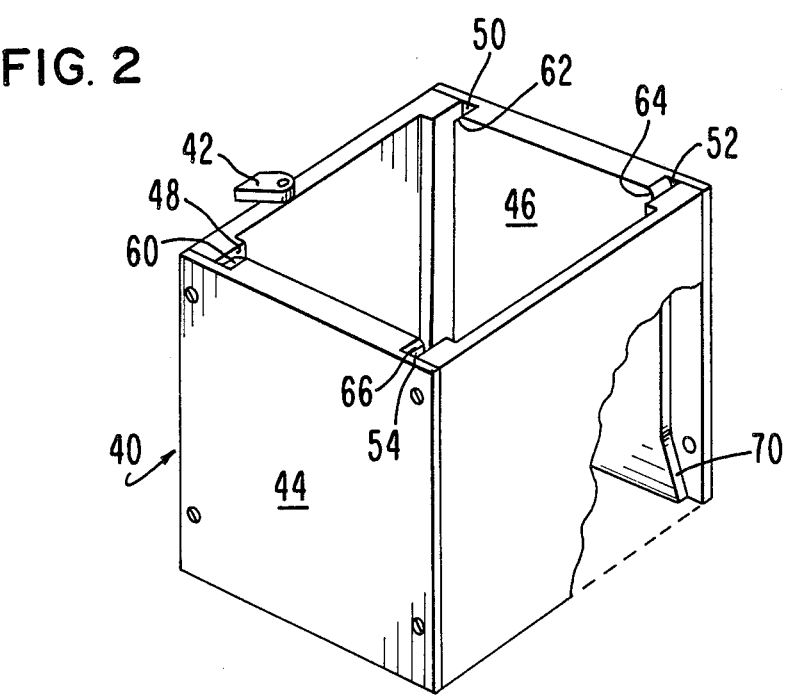
FIG. 2 is a perspective view of the magazine hopper for receiving the slide magazine shown in FIG. 1.
Figure 4:
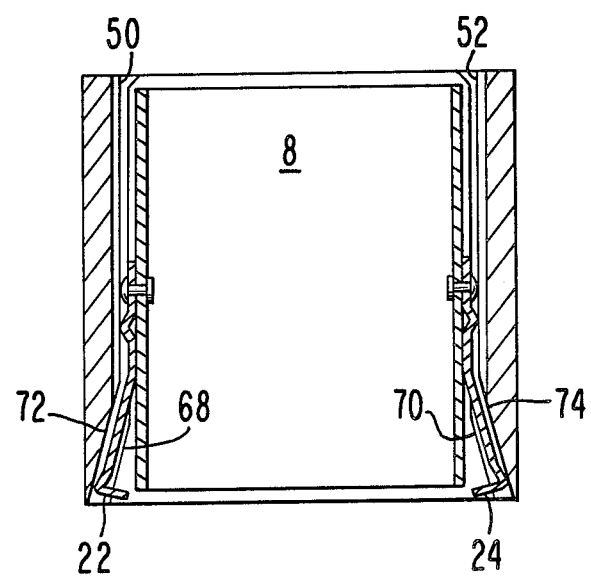
FIG. 4 is a cross-sectional view of the slide magazine shown in FIG. 1 in operational relationship with the hopper shown in FIG. 2.

FIG. 2 is a perspective view of the hopper (40) for receiving the slide magazine shown in FIG. 1. The slide hopper (40) allows slides to be dropped automatically, one-by-one, out of the hopper for slide editing purposes, as more fully described in U.S. Pat. No. 4,249,329 "Apparatus for Viewing and Sorting Photographic Slide Transparencies," granted on Feb. 10, 1981 to Owen L. Lamb. Slides are loaded into the hopper (40) by inserting the magazine in the hopper, and closing the catch (42). The opposing inner walls (44, 46) of the hopper are provided with grooves (48, 50, 52, 54) which line up with and receive the tines (26, 28). As shown in FIG. 4, the bottom portion (68, 70) of each groove bends outwardly to urge the tines and hence the tabs outward away from the walls of the slide magazine. The upper opening of each groove may be beveled (60, 62, 64, 66) to provide a funnel to guide the tines into the groove. The walls (44, 46) are provided with cavities (72, 74) at the lower portion in order to provide a space for the stop means as they move outwardly.

Figure 3:
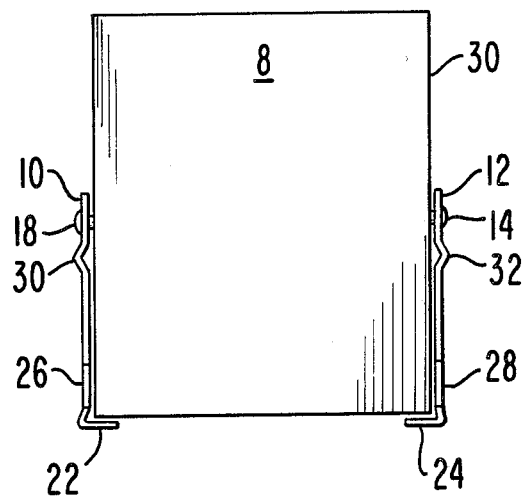
FIG. 3 is a cross-sectional view of the slide magazine shown in FIG. 1.

FIG. 3 is a cross-sectional view of the slide magazine shown in FIG. 1 showing the stop means (10, 12) in a first position wherein the lower opening of the slide magazine is partially covered.

FIG. 4 is a cross-sectional view of the slide magazine shown in FIG. 1 in operational relationship with the hopper shown in FIG. 2. FIG. 4 shows the stop means in a second position wherein the lower opening of the slide magazine is uncovered by the coaction of tines (26, 28) with the bottom portion (68, 70) of each groove which urge the tines and hence the tabs (22, 24) outward away from the slide magazine.

The above embodiment of the invention shows stop means on two opposing walls. Stop means may be provided on all four of the walls by placing the tines and tabs of all four stop means in such a relationship with each other that they do not interfere with each other nor with the operation thereof.

The invention has been described for use with photographic slides, but it will be readily understood by those skilled in the art that the principles of the invention can be practiced with other types of slides or slide-like structures, such as glass plates upon which a specimen is placed for examination under a microscope, etc. so long as the slide is made of a relatively stiff plate material.

While the invention has been particularly shown and described with reference to preferred embodiments thereof, it will be understood by those skilled in the art that the foregoing and other changes in form and detail may be made therein without departing from the scope of the invention.

What is claimed is:

1. A slide receptacle comprising:
   a bin (8) of substantially parallelepipedic shape, having an upper end, a lower end opposite said upper end, and four sidewalls;
   said bin being of such size and dimensions as to be capable of holding slides therein in a stack, with one slide stacked upon another,
   said four sidewalls structurally defining an upper opening at said upper end of said bin, said upper opening being of substantially the same size and dimensions as a slide so that said upper opening is able to permit slides that are held flat and dropped into said upper opening to enter said bin;
   said four sidewalls further structurally defining a lower opening at said lower end of said bin, said lower opening being of substantially the same size and dimensions as a slide so that said lower opening is able to permit slides that are held flat in said bin and dropped out of said lower opening to exit said bin;
   stop means (10, 12) located on first and second opposing sidewalls at said lower end;
   a first one (10) of said stop means including first means (22) for covering a first portion of said lower opening at said lower end; and,
   a second one (12) of said stop means including second means (24) for covering a second portion of said lower opening at said lower end;
   said stop means including spring-loading means (30, 32) for holding said first and second means (22, 24) under spring tension with respect to said first and second opposing sidewalls in a closed position in which said lower opening at said lower end is at least partially covered;
   said stop means (10, 12) further including a first section (26) and a second section (28) constructed in such a manner that said stop means can be spread apart, by the exertion of pressure on said first and second sections (26, 28) against said spring tension, to an open position in which said lower opening at said lower end is uncovered.

2. The slide receptacle in accordance with claim 1 wherein
   said first means (22) is an inwardly protruding tab;
   said second means (24) is an inwardly protruding tab;
   said first section (26) is a protruding tine; and,
   said second section (28) is a protruding tine.

3. A slide receptacle comprising:
   a bin of substantially parallelepipedic shape, having an upper end, a lower end opposite said upper end, and four sidewalls;
   said four sidewalls structurally defining an upper opening at said upper end of said bin, said upper opening being of substantially the same size and dimensions as a slide so that said upper opening is able to permit slides that are held flat and dropped into said upper opening to enter said bin;
   said four sidewalls further structurally defining a lower opening at said lower end of said bin, said lower opening being of substantially the same size and dimensions as a slide so that said lower opening is able to permit slides that are held flat in said bin and dropped out of said lower opening to exit said bin;
   stop means located on first and second opposing sidewalls at said lower end;
   a first one of said stop means including first means (22) for covering a first portion of said lower opening; and,
   a second one of said stop means including second means (24) for covering a second portion of said lower opening;
   said stop means being constructed such that said first and second means (22, 24) are held in a closed position in which said lower opening is at least partially covered;
   said stop means being movable, by the exertion of pressure thereon, to an open position in which said lower opening is uncovered;
   said first one of said stop means including a protruding tine (26);
   said second one of said stop means including a protruding tine (28).

4. The slide receptacle in accordance with claim 2 wherein said tabs (22, 24) are of such size and dimensions as to prevent slides in said bin from dropping out of said lower opening when said first and second means (22, 24) are in said closed position and for allowing slides to pass through said lower opening when said first and second means (22, 24) are in said open position.

5. The slide receptacle in accordance with claim 3 wherein said bin is of such size and dimensions as to receive and hold slides therein in a stack, with one slide stacked upon another.

6. The slide receptacle in accordance with claim 1 further including a hopper, some of the dimensions of which conform to some of the dimensions of said bin;
   said hopper being provided with engaging means (48, 50, 52, 54);
   said engaging means of said hopper being in such a position as to receive said first and second sections (26, 28) of said stop means (10, 12) in operative relationship therewith, a portion (70) of said engaging means being constructed so as to urge said stop means outward away from said opposing sidewalls of said bin by the exertion of pressure on said first and second sections (26, 28) of said stop means against said spring tension.

7. A slide receptacle comprising:
   a bin (8) of substantially parallelepipedic shape, having an upper end, a lower end opposite said upper end, and four sidewalls;
   said bin being of such size and dimensions as to be capable of holding slides therein in a stack, with one slide stacked upon another,
   said four sidewalls structurally defining an upper opening at said upper end of said bin, said upper opening being of substantially the same size and dimensions as a slide so that said upper opening is able to permit slides that are held flat and dropped into said upper opening to enter said bin;

said four sidewalls further structurally defining a lower opening at said lower end of said bin, said lower opening being of substantially the same size and dimensions as a slide so that said lower opening is able to permit slides that are held flat in said bin and dropped out of said lower opening to exit said bin;

stop means (10, 12) located on first and second opposing sidewalls at said lower end;

a first one (10) of said stop means including first means (22) for covering a first portion of said lower opening at said lower end;

a second one (12) of said stop means including second means (24) for covering a second portion of said lower opening at said lower end;

said stop means being spring-loaded (32) such that said first and second means (22, 24) are held under spring tension in a closed position in which said lower opening at said lower end is at least partially covered;

said stop means (10, 12) being movable in such a manner that said stop means can be spread apart, by the exertion of pressure thereon against said spring tension, to an open position in which said lower opening at said lower end is uncovered; and, a hopper, some of the dimensions of which conform to some of the dimensions of said bin;

said hopper being provided with engaging means (48, 50, 52, 54);

said engaging means of said hopper being in such a position as to receive said stop means (10, 12) in operative relationship therewith, a portion (70) of said engaging means being constructed so as to urge said stop means outward away from said opposing sidewalls of said bin;

said first one of said stop means including a protruding tine (26);

said second one of said stop means including a protruding tine (28);

said engaging means comprises grooves (48, 50, 52, 54), a bottom portion (70) of each groove bending outwardly;

said grooves being in such a position as to line up with and receive said tines (26, 28) in operative relationship therewith, said bottom portion (70) of each groove bending outwardly to urge the tines and hence the tabs outward away from said opposing sidewalls of said bin.

8. The slide receptacle in accordance with claim 7 wherein an upper opening of each groove is beveled (60, 62, 64, 66) to provide a funnel to guide said tines into said groove.

9. The slide receptacle in accordance with claim 8 wherein two opposing inner walls (44, 46) of said hopper are provided with cavities (72, 74) at the lower portion thereof for providing a space for said stop means as they extend outwardly.

10. A slide receptacle comprising:
a bin of substantially parallelepipedic shape, having a upper open end, a lower open end opposite said upper open end, and four sidewalls;
stop means located on first and second opposing sidewalls at said lower open end;
a first one of said stop means including a protruding tine (26);
a second one of said stop means including a protruding tine (28);
said first one of said stop means including an inwardly protruding tab (22) for partially covering said lower open end; and,
said second one of said stop means including an inwardly protruding tab (24) for partially covering said lower open end;
said stop means being flexible such that said tabs are held in a closed position in which said lower open end is partially covered;
said stop means being movable, by the exertion of pressure on said tines (26, 28), to an open position in which said lower open end is uncovered.

11. The slide receptacle in accordance with claim 10 wherein said tabs (22, 24) are of such size and dimensions as to prevent slides in said magazine from dropping out of said lower open end when said tabs are in said closed position and for allowing slides to pass through said lower open end when said tabs are in said open position.

12. The slide receptacle in accordance with claim 10 wherein said bin is of such size and dimensions as to receive and hold slides therein in a stack, with one slide stacked upon another.

13. The slide receptacle in accordance with claim 10 further including a hopper comprising:
four inner walls of substantially the same parallelepipedic shape as said bin, the dimensions of which conform to the outer dimensions of said bin;
two opposing inner walls (44, 46) being provided with grooves (48, 50, 52, 54), a bottom portion (24) of each groove bending outwardly;
said grooves being in such a position as to line up with and receive said tines (26, 28) in operative relationship therewith, said bottom portion (24) of each groove bending outwardly to urge the tines and hence the tabs outward away from said opposing sidewalls of said bin.

14. The slide receptacle in accordance with claim 13 wherein an upper opening of each groove is beveled (60, 62, 64, 66) to provide a funnel to guide said tines into said groove.

15. The slide receptacle in accordance with claim 13 wherein said two opposing inner walls (44, 46) are provided with cavities (72, 74) at the lower portion thereof for providing a space for said stop means as they extend outwardly.

* * * * *